Jan. 10, 1956 W. M. GRIMES, JR 2,730,674
ELECTRONIC TEST EQUIPMENT
Filed Sept. 12, 1952

INVENTOR
WILLARD M. GRIMES, JR.

BY
ATTORNEYS

United States Patent Office 2,730,674
Patented Jan. 10, 1956

2,730,674

ELECTRONIC TEST EQUIPMENT

Willard M. Grimes, Jr., Paterson, N. J., assignor to the United States of America as represented by the Secretary of the Navy Application September 12, 1952, Serial No. 309,321

3 Claims. (Cl. 324—20)

This invention relates to electronic testing equipment, and more particularly to the process and an electro-mechanical mechanism for testing the quality and operation of a radio tube while the tube is properly connected into a "live" circuit and is being vibrated.

In certain uses of radio tubes in telemetry, the device whose activities are to be telemetrically determined, for example, a projectile, aerial vehicle or missile, contains mechanism that sets up severe vibrations when in flight, and further vibrations and shocks may be produced by the mechanical interaction between the device and the medium in which it is traveling. Such vibrations and shocks make it necessary to employ selected radio tubes that are so excellently fabricated that their undesired response to mechanical disturbances falls well below the permissible maximum, above which the accuracy of the telemetric system would become seriously impaired.

It may be well to point out that all procedures or methods designed to locate satisfactory radio tubes must provide that during the vibration test, the tubes carry proper electrical loads, that is, that their filaments or heaters are correctly energized, and that proper anode and grid voltages are applied, so that the tube will be carrying its normal electrical load during the test. Otherwise the test would be practically useless, because a tube tested "cold" might have many latent faults that would become evident only during normal or simulated operation.

An object of the invention, therefore, is to provide a tube testing method, which includes subjecting the tube undergoing test to vibration while in simulated normal electrical operation, and simultaneously observing certain characteristics of such tube operation.

Another object of the invention is to provide a process and an electro-mechanical mechanism for testing electronic tubes under simulated field conditions.

Even another object of the invention is to provide apparatus for testing electronic tubes which is extremely simple and reliable in operation, and inexpensive to construct.

Other objects and many of the attendant advantages of this invention will be readily appreciated as the same becomes better understood by reference to the following detailed description when considered in connection with the accompanying drawing wherein.

In accordance with the invention, an electron or radio tube, which is part of a phase shift oscillator circuit arrangement, is mechanically isolated therefrom and is mounted on a shake table and vibrated by suitable means. The proper voltages are applied across the cathode, grids, and plate so as to simulate actual operation. The phase shift oscillator is an amplifier having feed back from the output circuit to the input circuit. Self oscillation will occur at a frequency determined by the phase shift between input and output. The wave passed by the amplifier is fed to an oscilloscope and the pattern thereof is observed so as to make a prediction of the quality of the tube.

Figure 1:
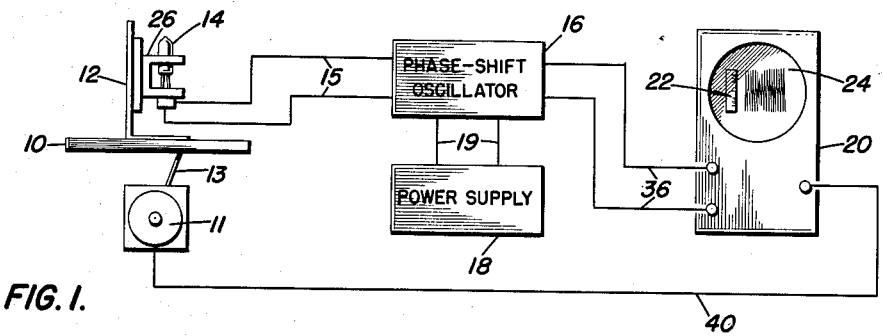
Fig. 1 is a block diagram of the mechanism and circuit connections.

Referring now to Fig. 1 of the drawing, the equipment employed in the test comprises a shake table 10 with a tube holder 12 mounted thereon, for vibrating a tube 14 which is a component part of a phase-shift oscillator 16. The oscillator is connected to tube 14 by leads 15, but is mechanically isolated therefrom. A suitable power supply 18 is connected by leads 19 to oscillator 16 and is sufficiently well filtered to assure that no spurious results would be produced by power fluctuations. A cathode ray oscilloscope 20 having a specially graduated scale 22 applied to its fluorescent screen 24 is utilized for facilitating the measurement of the luminous trace thereon as indicative of the performance of the tubes while under test.

The shake table 10, which may be conventional in design and, in most of the tests, is operated in the neighborhood of 40 cycles/sec. by means of suitable motor means 11 connected mechanically to table 10 by arm 13.

The phase-shift oscillator 16 is a device in the nature of an amplifier having feed-back from its output to its input, with the overall result that the amplifier will self-oscillate at a frequency determined by the phase shift between input and output, that is, such amplifiers provide a useful means for converting an angular phase shift into a frequency shift. Such phase-shift oscillators are likewise conventional.

The tube holder 12 and a quick-acting multiple clamp 26 for rapidly engaging and/or releasing the electrical connections to the radio tube elements may be of any suitable type. These tube holders 12 and tube-lead connectors have the purpose of holding the tube 14 and its electrical connections securely in spite of the vibration.

The oscilloscope 20 may likewise be of standard construction, but is modified to the extent of attaching the special scale 22, which may be drawn on gummed cellulose tape ("Scotch tape") or other preferable translucid material. The scale 22 extends from 100% at each end 30 and 32 to 0 at the center 34, and as shown, has its graduations spaced at ten (10) percent intervals.

The oscillator 16 is so connected by leads 36 to oscilloscope 20 that the output signal of oscillator 16 provides the vertical deflections of the oscilloscope tube while the horizontal sweep is synchronized through lead 40 with the frequency of the mechanical vibrations produced by the shake table 10.

Figure 2:
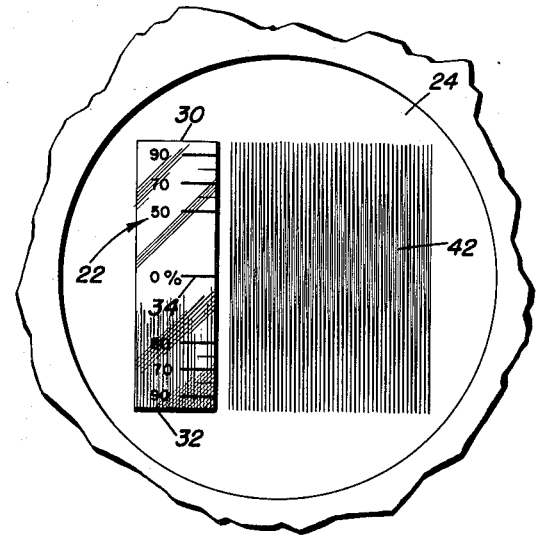
Fig. 2 is a diagrammatic representation of a trace on an oscilloscope screen, showing a performance of a perfect tube being tested.

Under these conditions, a pattern 42, shown in Fig. 2, of the trace produced by the cathode ray tube would be rectangular in nature, if the radio tube 14 under test were free from mechanical defects that would produce irregularities. The actual trace would, of course, be a single line, approximating a sine wave, but with a high ratio of amplitude to period, so that the successive sine waves would be practically in contact and would give the effect of completely filling the area of a rectangle. The "ideal" trace 42, shown in Fig. 2, would be produced by radio tubes that are mechanically rigid in the range covered by the test.

Figure 3:
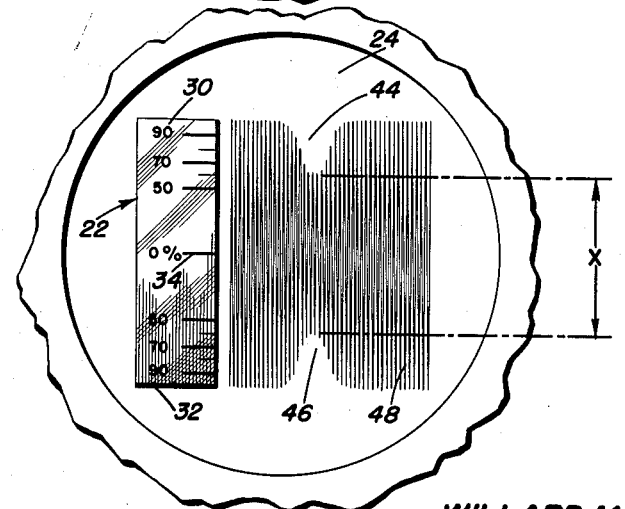
Fig. 3 is a diagrammatic representation similar to Fig. 2, showing a performance of an imperfect tube being tested.

More usually, however, such excellence of manufacture is not attained and one or several of the electrodes may be slightly loose, or resonant at certain mechanical frequencies and in such cases the trace will depart from the ideal shape, such as shown by pattern or trace 42, and show symmetrically placed dents 44 and 46 at the upper and lower sides of the rectangle trace 48, as illustrated in Fig. 3.

It has been found that when the distance X between the bottoms of the dents 44 and 46 is less than about three-quarters (¾) of the full vertical dimension of the rectangle, the radio tube 14, in general, will be unsatisfactory, although of course different standards of performance will be necessary for different purposes to which the radio tubes are to be applied.

The scale 22 added to the oscilloscope screen makes it possible to read the percentage ratio in question with sufficient accuracy on inspection, thus affording a quick way of testing and rating the radio tubes. The one-half (½) minute time required to warm up the tubes, plus the one (1) minute shaking period, at 40 cycles/sec., and with a maximum acceleration of 15 g., are usually found adequate to reveal the quality of the tube. Usually the shaking was performed solely with the longitudinal axis of the radio tube 14 being perpendicular to the direction of shake, particularly since comparative tests showed that there was but little difference between shaking the tubes axially and transversely.

In addition to affording the information as to relative rigidity of the radio tubes, the test also may give an insight into the nature of tube defects, by analysis of irregular trace-patterns that are produced by tubes having loose elements or foreign particles therein. This could be checked by testing radio tubes known to have certain defects.

It is to be noted that, in general, the present invention determines the effect that "noise" originating within a radio tube has on the signal passing through said tube and that it shows at a glance what may be expected of the tube under test.

In actual operation, the tube 14 that is to be tested is placed in tube holder 12 and the proper connections are made to apply voltages to the plate, grid, and cathode of the tube 14. The shake table 10 is vibrated by motor means 11 at the desired frequency. The output of the phase shift oscillator, which includes the tube 14, is then fed to the vertical plates of oscilloscope 20. The wave or pattern generated is viewed on oscilloscope screen 24, and the desired information as outlined above is then recorded concerning tube characteristics and quality.

Obviously many modifications and variations of the present invention are possible in the light of the above teachings. It is therefore to be understood that within the scope of the appended claims, the invention may be practiced otherwise than as specifically described.

What is claimed is:

1. An electro-mechanical mechanism for testing the operation of an electron tube, comprising, an electrical circuit including a power source and a phase shift oscillator having a tube connected therein, said tube being arranged to be mechanically isolated from said oscillator and the rest of said electrical circuit, holding means for said tube likewise mechanically isolated from said electrical circuit, means for vibrating said holding means and said tube while said tube is connected in said electrical circuit, and means connected to the output of said phase shift oscillator for observing and recording the operating characteristics of said tube.

2. An arrangement as set forth in claim 1, wherein said vibrating means comprises a shake table having said holding means mounted thereon.

3. An arrangement as set forth in claim 1, wherein, said observing and recording means comprises an oscilloscope.

References Cited in the file of this patent

UNITED STATES PATENTS

| | | |
|---|---|---|
| 2,103,450 | De Verter | Dec. 28, 1937 |
| 2,412,231 | Sharkey | Dec. 10, 1946 |
| 2,458,033 | Sterner | Jan. 4, 1949 |
| 2,476,297 | Harris | July 19, 1949 |
| 2,590,116 | Moland et al. | Mar. 25, 1952 |